United States Patent
Liu

(10) Patent No.: US 6,996,066 B1
(45) Date of Patent: Feb. 7, 2006

(54) METHOD TO ALLOCATE COMMODITY FLOW IN A MULTI-DIMENSIONAL COMMODITY FLOW NETWORK

(75) Inventor: Gang Liu, Denver, CO (US)

(73) Assignee: Lucent Technologies Inc., Murray Hill, NJ (US)

( * ) Notice: Subject to any disclaimer, the term of this patent is extended or adjusted under 35 U.S.C. 154(b) by 853 days.

(21) Appl. No.: 09/982,742

(22) Filed: Oct. 18, 2001

(51) Int. Cl.
- G01R 31/08 (2006.01)
- H04J 1/16 (2006.01)
- G06F 15/173 (2006.01)
- H04Q 7/20 (2006.01)

(52) U.S. Cl. ............... 370/238; 709/241; 455/445
(58) Field of Classification Search ........ 370/238, 370/252, 351; 709/241; 455/445; 701/202
See application file for complete search history.

(56) References Cited

U.S. PATENT DOCUMENTS

| | | | |
|---|---|---|---|
| 6,363,319 B1 * | 3/2002 | Hsu | 701/202 |
| 6,377,544 B1 * | 4/2002 | Muthukrishnan et al. | 370/229 |
| 6,411,946 B1 * | 6/2002 | Chaudhuri | 706/21 |
| 2003/0058798 A1 * | 3/2003 | Fleischer et al. | 370/238 |
| 2004/0125935 A1 * | 7/2004 | Enzmann et al. | 379/221.01 |

OTHER PUBLICATIONS

N. Garg and J. Konemann, "Faster and Simpler Algorithms for Multicommodity Flow and Other Fractional Packing Problems", Proceedings of the 39th Annual Symposium on Foundations of Comp. Science, pp. 300-309, Palo Alto, CA, Nov. 1998.

* cited by examiner

Primary Examiner—Alpus H. Hsu
Assistant Examiner—Lina Yang

(57) ABSTRACT

A fast on-line data flow allocation method efficiently determines the allocation of data flow among data paths, particularly when a parameter that influences data flow allocation is changed dynamically. In an illustrative embodiment, at least one commodity flow sample point is determined and a continuous boundary is constructed through the sample points. The continuous boundary (characterized as Maximum Flow Frontier) can be constructed off-line and may be used to determine new data flow allocations when a data flow allocation parameter changes. By developing a continuous boundary data flow, allocation parameters can be determined using a limited number of sample points. This can reduce the allocation complexity, and permit efficient data flow allocation.

11 Claims, 5 Drawing Sheets

METHOD TO ALLOCATE COMMODITY FLOW IN A MULTI-DIMENSIONAL COMMODITY FLOW NETWORK

FIELD OF THE INVENTION

This invention relates generally to network communications, and, more specifically, to determining maximum multi-commodity flow in a multi-dimensional data flow network.

BACKGROUND OF THE INVENTION

The distribution of data flow among multiple data paths between nodes in a communication network is an important consideration in the efficient operation of a communication network. When multiple data link paths exist between two network nodes, proper allocation of the data among the data paths reduces the potential of overloading a single data link or node, and increases the utilization of the network.

FIG. 1 illustrates a typical network configuration containing three primary nodes: A 100, B 110 and C 120. Numerous intermediate nodes are interconnected between nodes the primary nodes. Data flowing between primary nodes A and B may be distributed so as to pass through any one of a group of intermediate nodes. For example, intermediate nodes D 130 and E 140 may be used to route data from node A 100 to node B 110. Similarly, intermediate nodes F 150, G 160 and H 170 may be used to route data from primary node A 100 to primary node C 120, and intermediate node I 180 may be used to route data from primary node C 120 to primary node B 110. Thus, data that must be transmitted from primary node A 100 to primary node B 110 may be allocated to various combinations of paths, such as A-E-B, A-D-B, A-D-E-B, A-E-D-B, A-C-B, A-F-C-B, A-F-G-C-B, etc. These paths to which data may be allocated represent a single commodity flow.

Methods of determining the allocation of a commodity flow in a Point-to-Point network are known in the art. Usually, linear programming techniques are used to determine the allocation of data flow among various network data paths. For example, one such method which determines multi-commodity flow for a price distributed among the data links is disclosed by N. Garg and J. Konemann, in an article entitled "Faster and Simpler Algorithms for Multicommodity Flow and Other Fractional Packing Problems," Proceedings of the 39th Annual Symposium on Foundations of Comp. Science, pages 300–309, Palo Alto, Calif., November 1998, IEEE. Methods for determining commodity flow, however, are typically computationally intensive, requiring significant time to compute and determine a single distribution allocation. Accordingly, there is a need to provide a method to quickly determine a new allocation distribution which can be readily adapted to a computer and which is particularly adapted to situations when parameters that influence data flow allocation are changeable.

SUMMARY OF THE INVENTION

This invention relates to a fast on-line data flow allocation method utilizing unique principles of the invention to efficiently determine the allocation of data flow among data paths, particularly, when a parameter that influences data flow allocation is changed dynamically. In an illustrative embodiment, at least one commodity flow sample point is determined and a continuous boundary is constructed through the sample points. The continuous boundary (hereafter characterized as Maximum [Revenue] Flow Frontier or MFF) can be constructed off-line and may be used to determine new data flow allocations when a data flow allocation parameter changes. By developing a continuous boundary data flow, allocation parameters can be determine using a limited number of sample points. This reduces the allocation complexity, and permits efficient data flow allocation.

BRIEF DESCRIPTION OF THE DRAWINGS

The advantages, nature and various additional features of the invention will appear more fully upon consideration of the illustrative embodiments to be described in detail in connection with the accompanying drawings. In the drawings.

Figure 1:
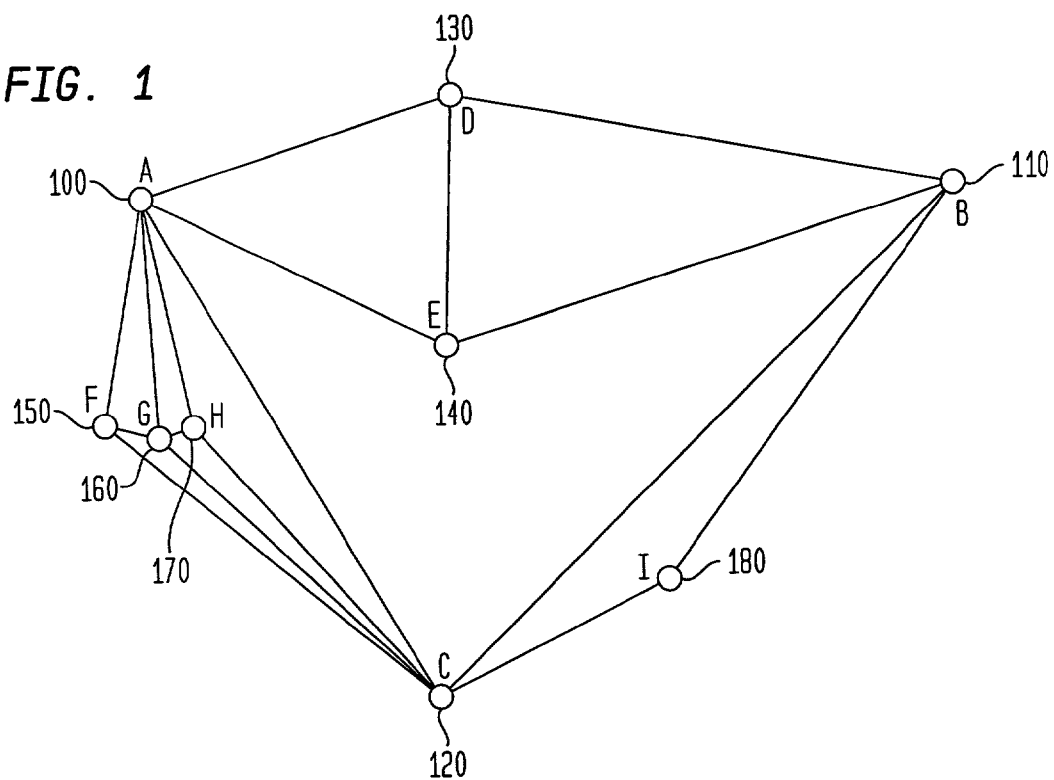
FIG. 1 illustrates a typical network configuration having multiple data paths between primary and intermediate network nodes.

It is to be understood that these drawings are for purposes of illustrating the inventive concepts of the present invention. It will also appreciated that the same reference numerals, possibly supplemented with reference characters where appropriate, have been used throughout the figures to identify corresponding parts on different figures.

DETAILED DESCRIPTION

One prime objective of network routing and management is to maximize the network revenue through efficient use of the pathways within the network. To model the maximum revenue, the following parameters need to be defined:

G(V, A): the network graph being considered;
V: the set of vertices of G;
A: the set of arcs;
K: the set of node pairs, each of which correspond a non-zero demand;
$f_k$: the total flow or total data transmitting rate between node pair k;
$p_k$: the price of per unit data flow for node pair k.

The total revenue "R" of the network flow can be formulated as:

$$R = \sum_k p_k f_k$$

Or equivalently, R=p·f, where p is the price vector and f is the flow vector in the K-dimensional space $E^K$.

For a given fixed p, there are many different feasible fs. Let f'''(p) be the flow vector which gives maximum R for the corresponding p. That is $$\max_p R = p \cdot f'''(p)$$

For any given arbitrarily chosen positive number λ, the following relationship will apply:

$$f'''(p) = f'''(\lambda p)$$

Then f'''(p) for all possible p represents a curve in $E^K$ and is called the maximum-flow-frontier (MFF). Those skilled in the art will understand that the MFF is a continuous and convex curve.

To maximize the network revenue is simply to allocate the network flow as f'''(p) for a given network and price vector. Usually, the network resources remain relatively stable, and thus the MFF is remains stable. There are approximate algorithms to find f'''(p) for a given p. However, the price vector p fluctuates dynamically. There are approximate algorithms to find f'''(p) on a timely basis and, correspondingly, allocation of the network flow to the computed f'''(p), becomes difficult, if not impossible, if the computation speed f'''(p) is slower than the fluctuation speed of p. For example, when the value f'''(p(t-τ)) is computed, the current price vector p(t) may be 2p(t-τ) or p(t-τ)/2. The computed frontier f'''(p(t-τ)) may give a revenue which is far from the maximum revenue. Therefore, in accordance with the invention, instead of computing the f'''(p) on-line, as with prior-art methods, the method of the invention first constructs the MFF off-line then finds the right f'''(p) through a fast method for on-line computation.

Figure 2:
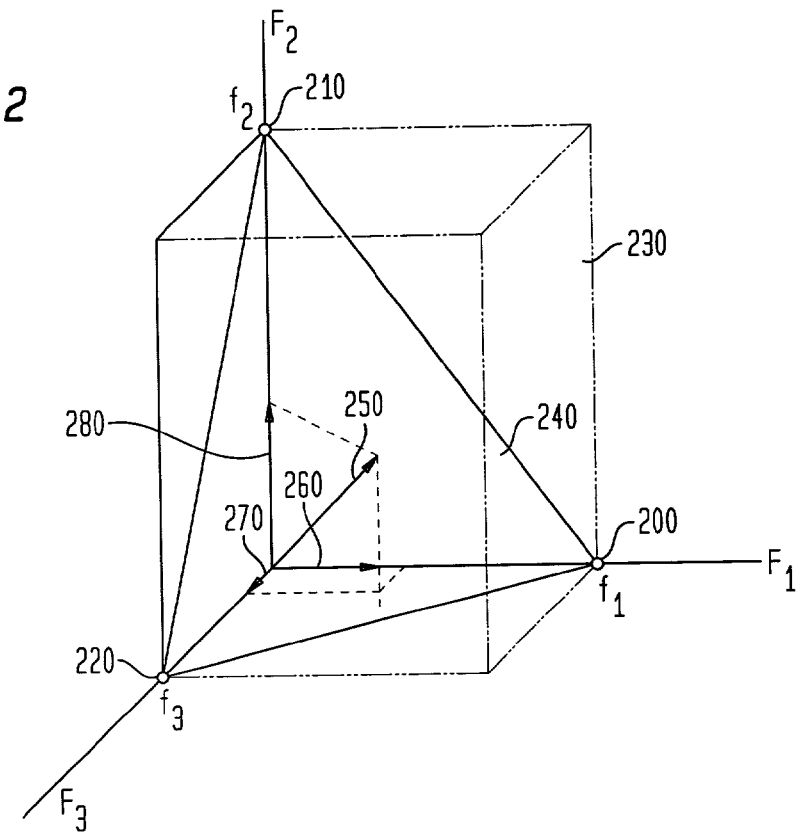
FIG. 2 represents the variation of commodity flow through a network.

The method of the invention will be better understood by reference to the figures, and to the description below. Considering FIGS. 1 and 2 together, FIG. 1 schematically depicts an typical data network configuration having multiple data paths between network nodes and FIG. 2 graphically illustrates an exemplary three-dimensional multi-commodity data flow among, for example, the three primary nodes A, B, & C of FIG. 1. Data flows between nodes A 100 and B 110 are represented by flow $F_1$ in FIG. 1. Also, in FIG. 1 data flows between nodes B 110 and C 120 are represented by flow $F_2$ and, data flows between nodes C 120 and A 100 are represented by flow $F_3$. In FIG. 2, point f1 200 on flow $F_1$, point f2 210 on $F_2$, and point f3 220 on flow $F_3$ represent the maximum single commodity data flow between the respective nodes. The single commodity flow values may be determined using linear programming techniques such as disclosed by Garg and Konemann, id. The points f1, f2 and f3 are also known as the pivots for their respective commodities.

The parameter vectors 260, 270 and 280 represent a data flow parameter characteristic that influences the allocation of data flow among the respective nodes. For example, a data flow parameter characteristic may be the cost of transmitting data along a data path or it may be the revenue collected. The summation vector 250 represents the vector summation of the parameter vectors 260, 270 and 280.

Solving a maximum revenue flow (MRF) problem for an N-dimensional flow space yields an N−1 dimensional curve, known as the Maximum Flow Frontier (MFF), that passes through all the pivots of the flow space. For example, solving an MRF problem for the three-dimensional flow space of FIG. 2 yields a two-dimensional Maximum Flow Frontier (MFF). The MFF is bounded by a plane 240 that passes through all the pivots and a surface of a cube 230 that passes through all pivots. The MFF is continuous in the area surrounded by the surface 230 and the plane 240.

Figure 3:
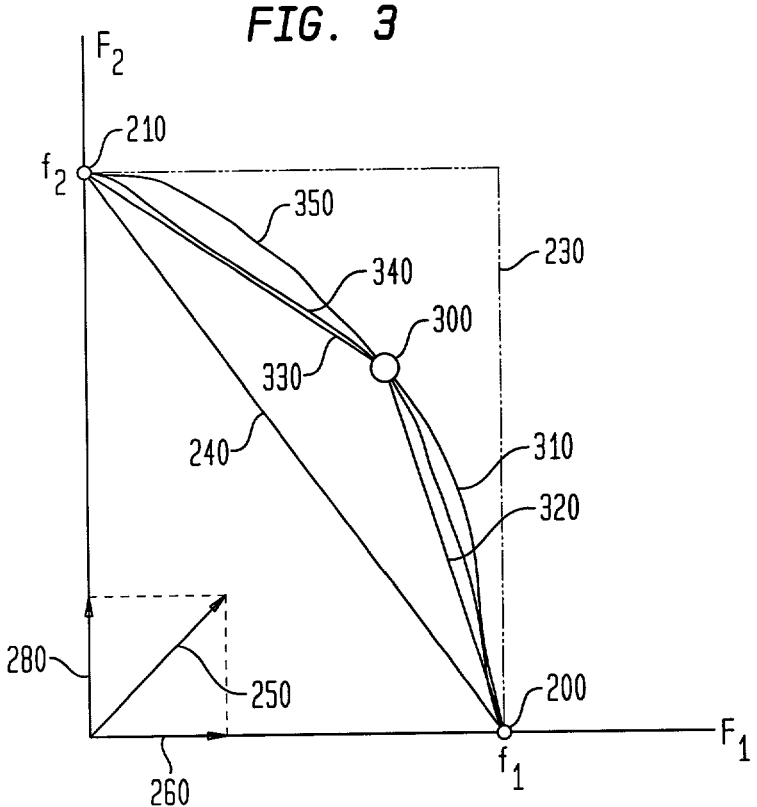
FIG. 3 represents graphically a multi-commodity data flow in two-dimensions.

FIG. 3 illustrates a two-dimensional representation of the multi-commodity flow of $F_1$ and $F_2$ of FIG. 2. The MFF of this two-dimensional space is bounded by the plane 240 and the surface of cube 230. To construct the MFF, a sample point 300 is determined using, for example, the previously discussed Garg and Konemann algorithm. An approximate MFF (AMFF) is determined by linearly joining points f2 210 and sample point 300 with a straight line 330 and joining sample point 300 to point f1 200 with a straight line 320. A large number of AMFFs can be drawn through points f1, f2 and sample point 300. Thus, a piece-wise linear continuous, AMFF is constructed that may be used to quickly determine flow rates when the price vectors 260 or 280 change.

In another embodiment, a polynomial of order greater than one can be drawn through the three illustrated points. Curve 350 (of FIG. 3) represents a polynomial of order greater than one connecting end points f1, f2 and sample point 300. In another embodiment, an AMFF may be constructed using a plurality of polynomials of order greater than one to connect the individual end and sample points. As illustrated in FIG. 3, an AMFF is constructed using curve 310 and curve 340, which are generated by polynomials of order greater than one and the polynomial surfaces are generated by spline functions wherein the second derivation of said spline functions. To provide a seamless transition between such polynomials, the polynomials are selected such that the value of their second derivative at a contacting sample point are equal.

Figure 4:
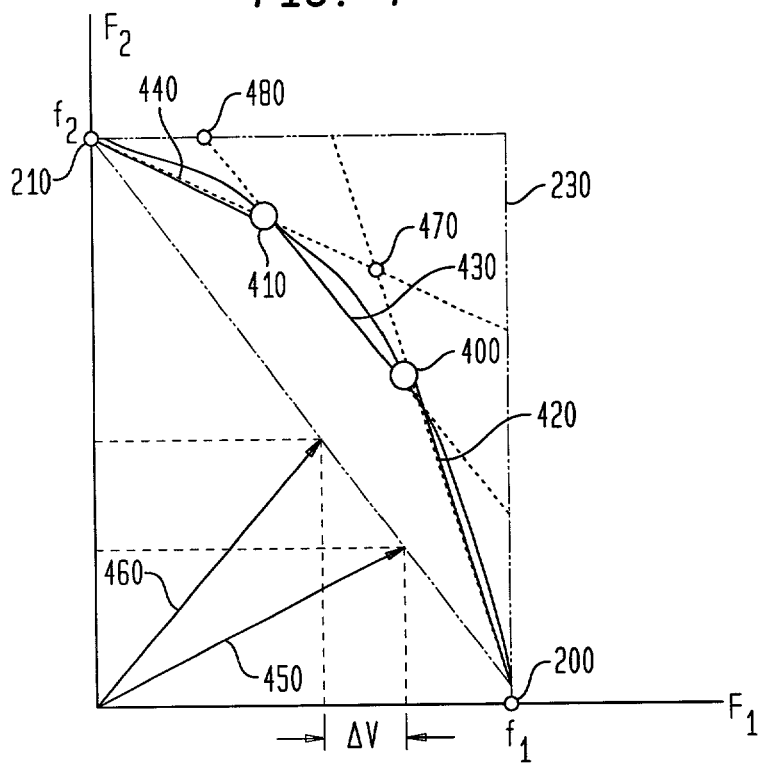
FIG. 4 represents graphically the multi-commodity data flow of FIG. 3 wherein additional sample points are used to derive a straight-line approximation.

FIG. 4 illustrates an AMFF constructed using two sample points 400 and 410 and the two end points f1 200 and f2 210. The AMFF in this embodiment is constructed using polynomials of order one, line segments 440, 430 and 420 between points f2 210 and sample point 410, between sample points 410 and 400, and between sample point 400 and point f1 200, respectively.

An error bound can be determined by extending line segments 440, 430 and 420. For example, the error between the piece-wise linear AMFF and the MFF is contained within the triangular area having the three vertices, sample points 400, 410 and point 470, which is formed at the intersection of the extended line segments 420, 440. Similarly, the MFF is bound by the triangular area having end point f2 210 and sample point 410 as two vertices and a third vertex at point 480, which is the intersection of the extended line segment 430 and the maximum single commodity flow along flow $F_2$.

Figure 5:
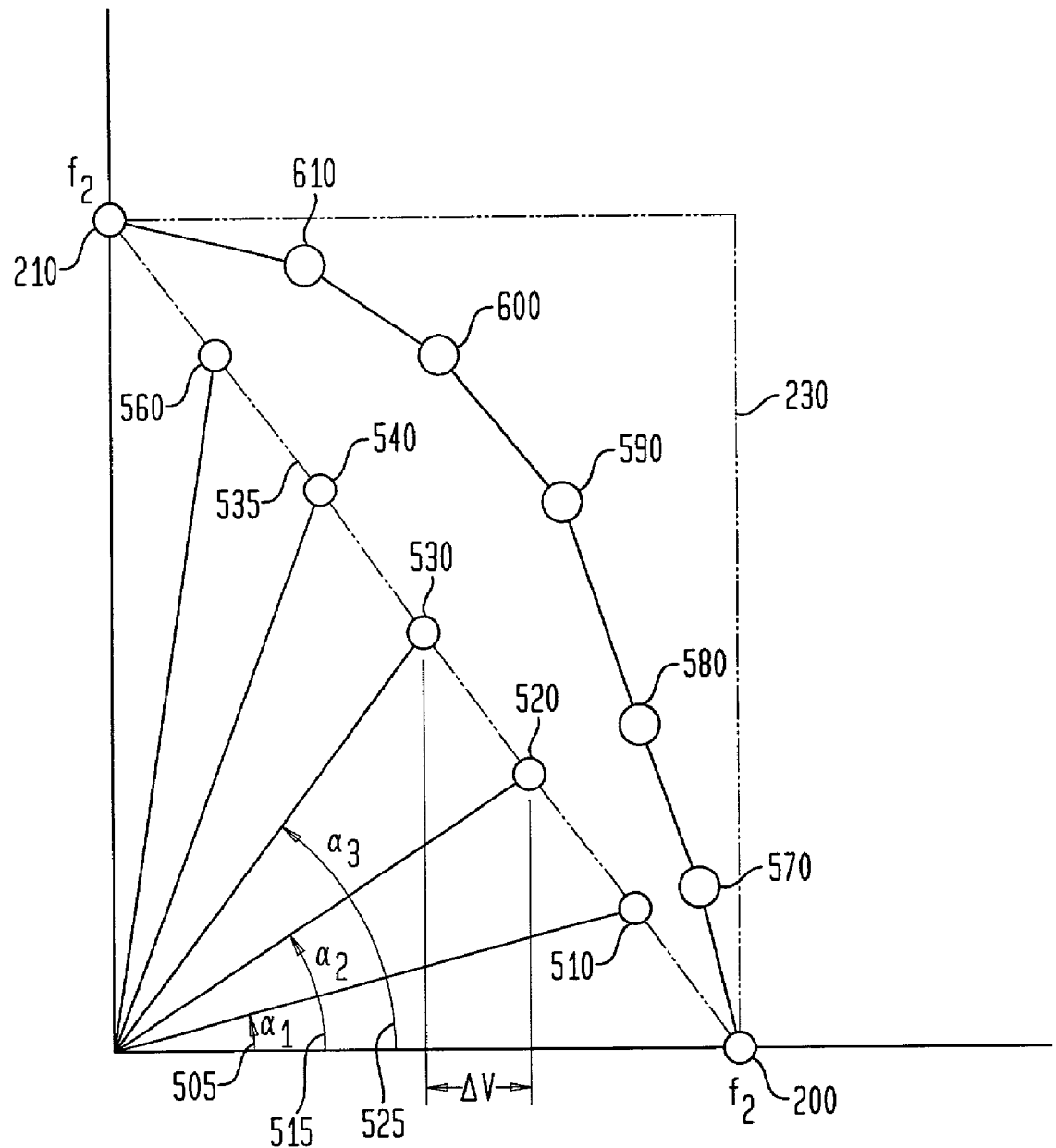
FIG. 5 represents graphically the multi-commodity flow of FIG. 3 using additional sample points to further derive an approximate boundary in accordance with the principles of the invention.

In FIG. 5, five sample points 510, 520, 530, 540 and 560 are positioned along minimal AMFF at spacing defined by Δv. This spacing is chosen to reduce the maximum error between a MFF and an AMFF. From each of sample points 510, 520, 530, 540 and 560, a direction of an identifying characteristic may be obtained. Direction is determined by specifying an angular displacement from a reference axis. A direction of an identifying characteristic between point 510 and the origin may be specified by the angular displacement, $\alpha_1$. Similarly, displacements $\alpha_2$ and $\alpha_3$ specify the direction of an identifying characteristic from points 520, 530 respectively.

Sample points along the MFF may be determined based on the directions of the identifying characteristic using, for example, the Garg and Konemann algorithm, as previously discussed. Sample points 570, 580, 590, 600 and 610, which lie on the MFF, correspond to point 510, 520, 530, 540 and 560, respectively. An AMFF may then be constructed between end points $f_1$, 200 and $f_2$, 210 and sample points 570, 580, 590, 600 and 610. In this example, the AMFF is constructed using linear segments. The AMFF can be used to determine data flow factors at points other than the sample points 570, 580, 590, 600 and 610 with known values of errors introduced.

Figure 6:
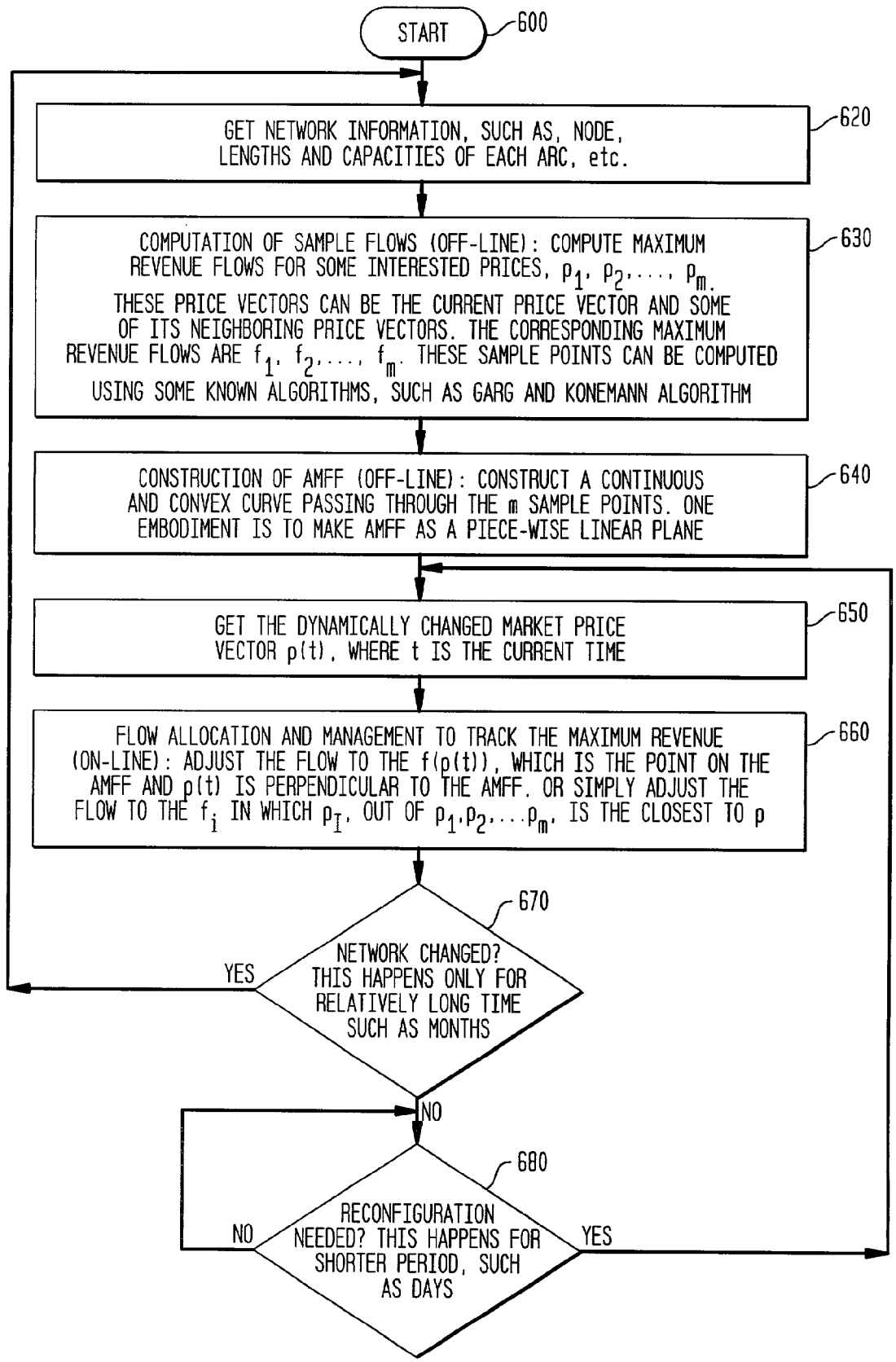
FIG. 6 represents a flow-chart of the processing steps in accordance with the principles of the invention.

A flow chart of the method of the invention is shown in FIG. 6. Starting at Block 600, the network information, such as nodes location, length and available capacities of the links, is acquired at Block 620. Some sample points $f_1$, $f_2$, ... $f_m$ are computed at Block 630 to determine the maximum revenue flows for some interested and fixed prices, $p_1, p_2, \ldots, p_m$. These sample points can be computed off-line using known algorithms, such as the Garg and Konemann algorithm. In Block 640 the AMFF is constructed. An AMFF is an continuous and convex curve passing through these given sample points, $f_1, f_2 \ldots, f_m$. A simple AMFF is the piece-wise linear plane that passes through these sample points. The price data are obtained repeatedly at block 650. The price vector p (t) may change with time t dynamically—e.g., it may change a lot during a short period, such as a single day, while the network may remain unchanged during months, or even years.

To track the maximum revenue while p(t) varies with time, the AMFF can be reused. The AMFF may be constructed, as previously discussed, using a piece-wise linear approximation or using polynomials of order greater than one. In Block 660 the method of the invention operates to adjust and reallocate the flows while the price vector changes, such that the maximum revenue are realized. This can be done by adjusting the flow to the point on the AMFF which is perpendicular to the price vector p(t). Alternatively the flow can simply be adjusted to the $f_i$ in which $p_1, p_2 \ldots, p_m$, is the closest to p(t) in the case where the AMFF is difficult to construct.

Since both the MFF and AMFF are convex, a unique tangent plane is existed at any point on MFF or AMFF. This guarantees to find a unique maximum flow on the MFF or AMFF for a given price vector, i.e., a unique tangent plane of MFF or AMFF that is perpendicular to a given price vector.

A check is made at block 670 against changes in the network, such as an expansion of the network. If the network is changed the method returns to block 620; otherwise it goes to block 680. Another check is made at block 680 against whether reconfigurations are needed. Usually, such reconfiguration are pre-planned and therefore can be made at a predetermined time.

The network usually changes over a relatively long period, such as months, thus the loop from 620 to 670 may happen only once in several months, while the loop from 650 to 680 may happen once in several days. The loop 620–670 is carried out by off-line computation which traces the network changes, while the loop 650-680 is on-line flow reallocation procedures which trace the prices changes such that the revenue is maximized.

Figure 7:
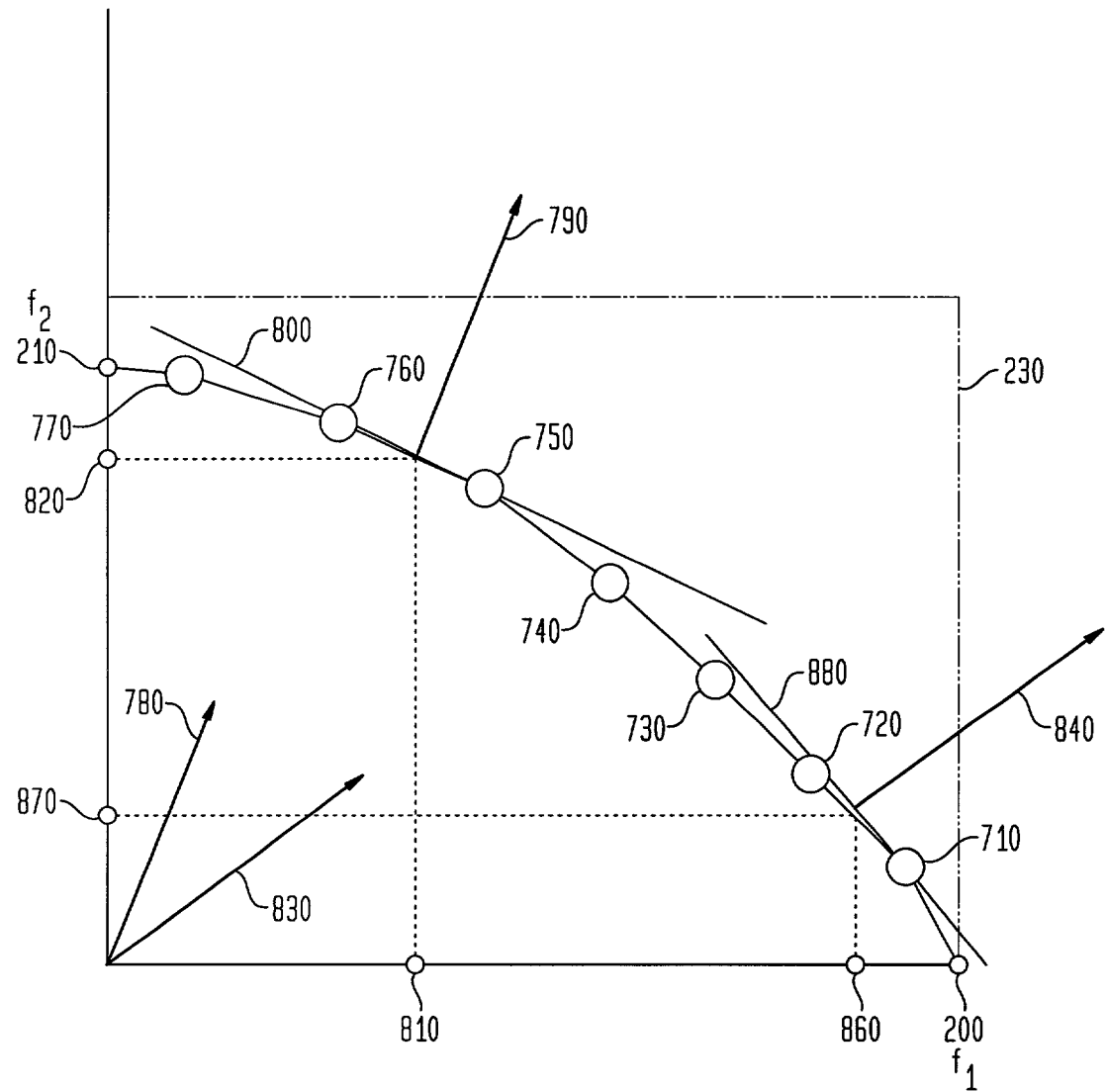
FIG. 7 illustrates an exemplary application of the principles of the invention in determining multi-commodity flow through a network configuration.

FIG. 7 illustrates an application of the present invention, in determining a data flow to maximize an identifying characteristic. In this example, an AMFF is constructed using a piece-wise linear approximation between end points f2 210 and f1 200 and sample points 710, 720, 730. 740, 750, 760, and 770. Vector 780 represents a composite identifying characteristic, for example, revenue. That is; vector 780 is the composite revenue of the revenue generated by commodity data flows on flow F1 and commodity flow on flow F2. In accordance with the principle of the invention, the maximum revenue is achieved at the point that the revenue vector is perpendicular to AMFF. FIG. 7 illustrates a graphic determination of the data flow allocation to achieve maximum revenue as vector 780 is transposed as vector 790 and vector 790 is perpendicular to line 800, which is tangent to AMFF. Numerous methods of determining perpendicular relationship being two components are known in the art. For example, using vector mathematics, two vectors are perpendicular when the "dot" product between the vectors is zero. The maximum revenue may be achieved when the data flow is allocated to achieve data flows along F1 and F2 that are represented by flow rates 810 and 820, respectively. Similarly, when the price changes, a new maximum may be quickly determined. As illustrated, maximum revenue using price vector 830 is achieved when the data flow is allocated along F1 and F2 to correspond to data flow rates represented by points 860 and 870, respectively.

The examples given herein are presented to enable those skilled in the art to more clearly understand and practice the instant invention. The examples should not be considered as limitations upon the scope of the invention, but as merely being illustrative and representative of the use of the invention. The examples should not be considered limitations upon the scope of the invention, but as merely being illustrative and representative of the use of the invention. Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention and is not intended to illustrate all possible forms thereof.

The invention claimed is:

1. A method for rapid data flow allocation in a point to point network having data paths and node elements, and having a dynamically variable set of parameters of collective value p(t) at a given time t, such that a measure of goodness of a given data flow allocation is a function of p(t), comprising:

acquiring network information including node location, length and available paths;

computing sample points of maximum revenue flows for specified values of the parameters;

constructing an approximate maximum-flow-frontier (MFF) utilizing the computed sample points; and obtaining an updated market parameter vector p(t) as a function of time, and applying piece-wise linear approximation to construct an updated approximate MFF from parameter vector p(t).

2. The method recited in claim 1 wherein the step of computing sample points is done off-line utilizing linear programming techniques.

3. The method recited in claim 1 wherein the step of constructing the MFF is done off-line utilizing linear programming techniques.

4. The method recited in claim 1 wherein said parameter p(t) is price.

5. The method recited in claim 1 further including the step of tracking the maximum value of parameter p(t) as it varies with time through the reconstruction of the approximate MFF.

6. The method recited in claim 1 wherein the step of constructing utilizes polynomials of order greater than one.

7. The method recited in claim 1 wherein the applying step involves adjusting and reallocating flows while the parameter vector p(t) changes such that the actual MFF is realized.

8. The method recited in claim 7 wherein the flow is adjusted to the point on the approximate MFF which is perpendicular to the parameter p(t) vector.

9. The method recited in claim 1 further including a step of checking for network expansion which restarts the process at the acquiring step.

10. The method recited in claim 1 further including a step of checking for reconfiguration needs within the network which restarts the process at the acquiring step.

11. The method recited in claim 1 wherein the acquiring, computing and constructing steps are done off-line, and the obtaining and applying steps are done on-line.

* * * * *